United States Patent
Hirose et al.

(10) Patent No.: US 12,163,312 B2
(45) Date of Patent: Dec. 10, 2024

(54) WORK SUPPORT SYSTEM AND WORK SUPPORT COMPOSITE SYSTEM

(71) Applicant: KOBELCO CONSTRUCTION MACHINERY CO., LTD., Hiroshima (JP)

(72) Inventors: Ryuichi Hirose, Tokyo (JP); Yuki Morita, Hiroshima (JP); Yuya Matsuda, Hiroshima (JP); Masaki Otani, Hiroshima (JP); Seiji Saiki, Tokyo (JP); Yoichiro Yamazaki, Tokyo (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 358 days.

(21) Appl. No.: 17/690,295

(22) Filed: Mar. 9, 2022

(65) Prior Publication Data

US 2022/0307224 A1  Sep. 29, 2022

(30) Foreign Application Priority Data

Mar. 29, 2021  (JP) .................. 2021-055067

(51) Int. Cl.
 *E02F 9/20* (2006.01)
 *G05D 1/00* (2006.01)

(52) U.S. Cl.
 CPC ............ *E02F 9/205* (2013.01); *E02F 9/2054* (2013.01); *G05D 1/0027* (2013.01); *G05D 1/0038* (2013.01)

(58) Field of Classification Search
 CPC ......... E02F 9/205; E02F 9/2054; E02F 9/264; E02F 9/20; E02F 9/26; G05D 1/0027;
 (Continued)

(56) References Cited

U.S. PATENT DOCUMENTS

| 6,342,915 B1* | 1/2002 | Ozaki ............... H04N 7/18 340/505 |
| 2011/0282519 A1* | 11/2011 | Carlsson ........... E02F 9/205 701/2 |

(Continued)

FOREIGN PATENT DOCUMENTS

| JP | 2019-176401 A | 10/2019 |
| WO | 2020/250558 A1 | 12/2020 |
| WO | 2021/019948 A1 | 2/2021 |

OTHER PUBLICATIONS

European Search Report for Application EP 22 16 0221; date provided in record Sep. 28, 2022. (Year: 2022).*

(Continued)

*Primary Examiner* — Calvin Cheung
(74) *Attorney, Agent, or Firm* — Carrier, Shende & Associates P.C.; Joseph P. Carrier; Jeffrey T. Gedeon

(57) ABSTRACT

The remote operation system has a mutual communication function of communicating with each of plural work machines and a remote operation device which remotely operates a cooperating work machine as a remote operation target among the plural work machines. The remote operation system includes a first support process element that acquires captured image which is captured by an actual machine image-capturing device of a first work machine establishing communication by a first communication path and transmits the captured image to the remote operation device and a second support process element that recognizes that one designation operation is performed, which is a portion of plural operations for causing a second work machine establishing communication by a second communication path and in which a changing situation corresponding to the operation appears in the captured image and that transmits a command signal corresponding to the one designation operation to the second work machine.

4 Claims, 8 Drawing Sheets

(58) Field of Classification Search
CPC .............. G05D 1/0038; G06K 17/0022; H04L 67/125; H04N 7/18; H04N 7/181
See application file for complete search history.

(56) References Cited

U.S. PATENT DOCUMENTS

| | | | |
|---|---|---|---|
| 2014/0170617 A1* | 6/2014 | Johnson | G09B 19/167 |
| | | | 434/219 |
| 2015/0052591 A1* | 2/2015 | Miura | A01B 79/005 |
| | | | 726/4 |
| 2016/0224021 A1* | 8/2016 | Kuikka | B02C 21/026 |
| 2017/0016211 A1* | 1/2017 | Arimatsu | G01S 19/14 |
| 2017/0089042 A1* | 3/2017 | Machida | B60R 1/28 |
| 2018/0024549 A1* | 1/2018 | Hurd | A01B 69/008 |
| | | | 701/2 |
| 2018/0044893 A1* | 2/2018 | Machida | H04N 23/90 |
| 2019/0251760 A1* | 8/2019 | Komiyama | G07C 5/008 |
| 2021/0002860 A1 | 1/2021 | Otani et al. | |
| 2022/0245856 A1 | 8/2022 | Hoso et al. | |

OTHER PUBLICATIONS

European Search Opinion for Application EP 22 16 0221; date provided in record Sep. 28, 2022. (Year: 2022).*
WO 2019187565 A1 with English Translation; date filed Jan. 24, 2019; date published Oct. 3, 2019. (Year: 2019).*
WO 2019181103 A1 with English Translation; date filed Dec. 11, 2018; date published Sep. 26, 2019. (Year: 2019).*
Extended European search report dated Sep. 28, 2022 issued in the corresponding EP Patent Application No. 22160221.2.

* cited by examiner

FIG.2

| SELECTION INFORMATION | FIRST IP ADDRESS (FIRST COMMUNICATION PATH) (FIRST IDENTIFIER) | SECOND IP ADDRESS (SECOND COMMUNICATION PATH) (SECOND IDENTIFIER) | ACTUAL MACHINE IDENTIFICATION INFORMATION | POSITION INFORMATION |
|---|---|---|---|---|
| WORK MACHINE A | IDENTIFIER A-1 | IDENTIFIER A-2 | No. ○○ | .... |
| WORK MACHINE B | IDENTIFIER B-1 | IDENTIFIER B-2 | No. △△ | .... |
| WORK MACHINE C | IDENTIFIER C-1 | IDENTIFIER C-2 | No. ×× | .... |

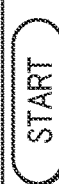
FIG.8

WORK SUPPORT SYSTEM AND WORK SUPPORT COMPOSITE SYSTEM

BACKGROUND OF THE INVENTION

Field of the Invention

The present invention relates to a remote operation system having a mutual communication function of communicating with each of plural work machines and with a remote operation device for remotely operating one work machine as a remote operation target among the plural work machines.

Description of the Related Art

In related art, an operator operates a work machine from a remote place without riding the work machine. As such a work machine, for example, Japanese Patent Laid-Open No. 2019-176401 discloses a remote operation system in which a master and a slave are provided to be capable of communicating with each other, the operator operates an operation lever provided to the master, and the slave arranged in an operator seat of a work machine thereby operates an operation lever of the work machine.

SUMMARY OF THE INVENTION

Incidentally, in a case where two or more work machines are remotely operated by one master, the master and respective slaves provided to work machines have to be connected together to be capable of communicating with each other.

Further, an operator performs a remote operation by operating an operation lever or the like while viewing an image around the work machine as an operation target by a monitor of the master.

However, there may be a case where an image displayed on the monitor of the master is an image around a work machine which is different from the work machine as the operation target. In a case where the operator actually rides a work machine, the operator can check an external appearance of the work machine and circumstances of a site where the work machine is positioned, but in a case where the work machine is remotely operated, such a check cannot be performed. Thus, it is difficult for the operator to notice that a remote operation device is connected with an unintended work machine (different slave). Even when the operator attempts to perform a check by videos captured by cameras mounted on the work machines, because those videos are similar in appearance, it is difficult to distinguish one from another. In such a case, when a remote operation is performed, there is a possibility that an operation is performed for the work machine which is not recognized as the operation target by the operator.

The present invention has been made in consideration of such problems, and an object thereof is to provide a remote operation system that is capable of making a check about whether a work machine which acts in accordance with an operation by an operator agrees with a work machine selected by the operator.

To achieve such an object, a remote operation system of the present invention is a remote operation system having a mutual communication function of communicating with each of plural work machines and with a remote operation device which remotely operates a cooperating work machine as one work machine as a remote operation target among the plural work machines, the remote operation system including: a first support process element that acquires a determination result about whether or not a designation operation of selection information specifying the cooperating work machine as the remote operation target among the plural work machines in the remote operation device is executed and acquires a captured image which is captured by an actual machine image-capturing device mounted on a first work machine establishing communication with the remote operation device by a first communication path associated with the selection information in a case where the selection information is selected in the remote operation device and that causes an output interface of the remote operation device to output the captured image; and a second support process element that recognizes that one designation operation is performed, which is a portion of plural kinds of operations for causing a second work machine among the plural work machines to act, the second work machine establishing communication with the remote operation device by a second communication path associated with the selection information, and in which a changing situation of an action corresponding to the operation appears in the captured image, and that transmits a command signal corresponding to the one designation operation to the second work machine.

BRIEF DESCRIPTION OF THE DRAWINGS

FIG. 2 is an explanatory diagram illustrating an example of a data structure stored in a database of a work support server;

FIG. 8 is a flowchart illustrating an example of a work support process by the work support server.

DETAILED DESCRIPTION OF THE PREFERRED EMBODIMENT

Configuration of Remote Operation System

Figure 1:
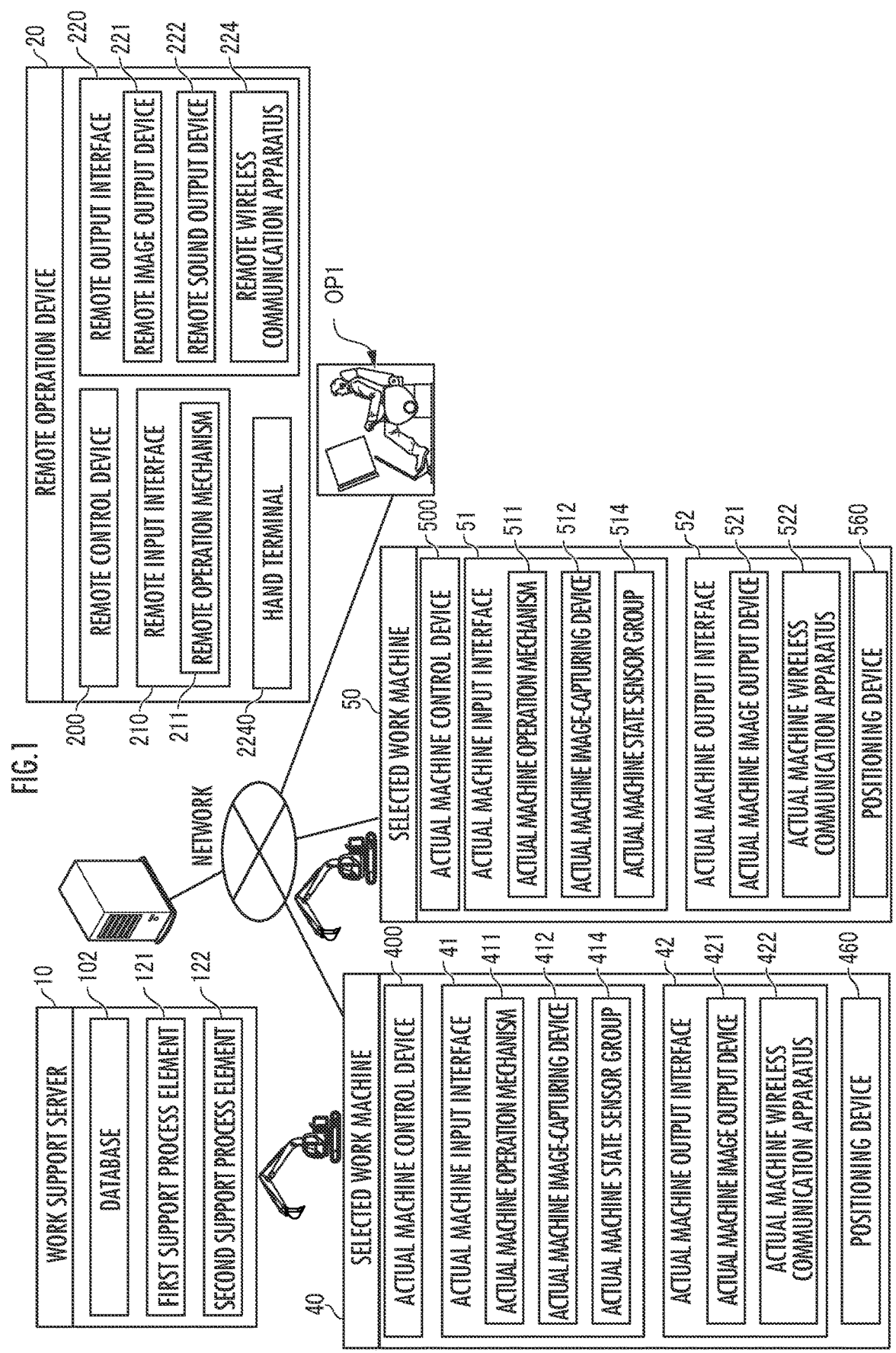
FIG. 1 is a configuration explanation diagram of a work support composite system as one embodiment of the present invention.

A work support system as one embodiment of the present invention, which is illustrated in FIG. 1, is configured with a work support server 10 for supporting remote operations of a first selected work machine 40 and a second selected work machine 50 by a remote operation device 20. The work support server 10, the remote operation device 20, the first selected work machine 40, and the second selected work machine 50 are configured to be capable of communicating with each other via a shared or separate network. Note that in FIG. 1, the work support server 10 is capable of being connected with the first selected work machine 40 or the second selected work machine 50, but it is sufficient that the work support server 10 is capable of being connected with two or more work machines, and the number of connected work machines is not limited. Further, either one of the first selected work machine 40 or the second selected work machine 50 which are operated by the remote operation device 20 will also be referred to as a cooperating work machine.

In the present embodiment, the work support server 10 will be described as a remote operation system which has a mutual communication function of communicating with each of plural selected work machines and with a remote operation device for remotely operating a cooperating work machine as a remote operation target among the plural selected work machines. Further, in the present embodiment, a description will be made about an example of a work support system which configures a composite system with the work support server 10, the remote operation device 20, the first selected work machine 40, and the second selected work machine 50.

"Acquiring" of various kinds of information by configuration elements (hardware) of the present invention represents a concept encompassing all computation processes for preparing various kinds of information in usable forms in the following computation processes, such as receiving the information, reading or searching for the designation information from an internal storage device (for example, a memory) and/or an external storage device (for example, an external database server), and calculating, estimating, predicting, identifying, and so forth designation information by executing a computation process for information, which is received, read, searched for, and so forth, as a target.

Configuration of Work Support Server

The work support server 10 comprises a database 102, a first support process element 121, and a second support process element 122. The database 102 stores and retains captured image data and so forth. The database 102 may be configured with a database server separate from the work support server 10.

As illustrated in FIG. 2, the database 102 retains first identifiers (an identifier A-1, an identifier B-1, and an identifier C-1) which are assigned to communication paths (first communication path) of an actual machine image-capturing device 412 mounted on the first selected work machine 40 and of an actual machine image-capturing device 512 mounted on the second selected work machine 50 and which are for identifying work machines on a network (the first identifier is a first IP address assigned to each apparatus of a work machine, for example), second identifiers (an identifier A-2, an identifier B-2, and an identifier C-2) which are assigned to communication paths (second communication path) of an operation system of the first selected work machine 40 and of an operation system of the second selected work machine 50 and which are for identifying work machines on a network (the second identifier is a second IP address assigned to each apparatus of a work machine, for example), and actual machine identification information which includes information of the respective work machines corresponding to the identifiers assigned to the first selected work machine 40 and the second selected work machine 50. Further, the database 102 stores position information sequentially transmitted from each work machine as global navigation satellite system (GNSS) data.

In addition, the database 102 stores map data (not illustrated) of a region including each piece of position information. Note that plural sets of map data stored in the database 102 are desirably stored while being sorted by work sites. For example, the plural sets of map data are desirably stored such that the map data corresponding to a work site selected by the operator are capable of being referred to.

Each of the first support process element 121 and the second support process element 122 is configured with an arithmetic processing unit (a single-core processor or a multi-core processor or a processor core configuring that), reads necessary data and software from a storage device such as a memory, and executes a computation process, described later, following the software for the data as a target.

Configuration of Remote Operation Device

The remote operation device 20 comprises a remote control device 200, a remote input interface 210, and a remote output interface 220. The remote control device 200 is configured with an arithmetic processing unit (a single-core processor or a multi-core processor or a processor core configuring that), reads necessary data and software from a storage device such as a memory, and executes a computation process following the software for the data as a target.

The remote input interface 210 comprises a remote operation mechanism 211 and a hand terminal 2240. The remote output interface 220 comprises a remote image output device 221, a remote sound output device 222, a remote wireless communication apparatus 224, and the hand terminal 2240. The hand terminal 2240 is used for both of the remote input interface 210 and the remote output interface 220.

The remote operation mechanism 211 includes operation devices for one designation operation, each of which is for performing one designation operation, such as a wiper operation device for a wiper which wipes water drops such as rain water adhered on an outer surface of a windshield of the first selected work machine 40 or the second selected work machine 50 and a headlight operation device for a headlight which is capable of projecting light to a front area of the first selected work machine 40 or the second selected work machine 50.

Note that one designation operation preferably assists work of a work machine. One designation operation is preferably about an operation such as an operation of a wiper device or the like and an operation for a lighting device such as a headlight, a stop lamp, or a room light, for example. Note that in a case where sound is included in a captured image, one designation operation may be about an operation for a sound output device which outputs a buzzer or an activation sound.

The operation device for one designation operation has a push button which accepts an input by depression, for example. The wiper operation device (push button) is depressed and thereby starts or stops an action of the wiper of the first selected work machine 40 or the second selected work machine 50. Further, the headlight operation device (push button) is depressed and thereby starts or stops lighting by the headlight of the first selected work machine 40 or the second selected work machine 50.

Further, the remote operation mechanism 211 includes a traveling operation device which accepts an operation about traveling of the first selected work machine 40 or the second selected work machine 50, a revolution operation device which accepts an operation about revolution of the first selected work machine 40 or the second selected work machine 50, a boom operation device which accepts an operation about a boom of the first selected work machine 40 or the second selected work machine 50, an arm operation device which accepts an operation about an arm of the first selected work machine 40 or the second selected work machine 50, and a bucket operation device which accepts an operation about an attachment such as a bucket of the first selected work machine 40 or the second selected work machine 50. In other words, the remote operation mechanism 211 includes an operation device for another designation operation for performing the other designation operation. As described above, another designation operation includes an action which possibly causes interference between an object present around the cooperating work machine and the cooperating work machine in a case where the cooperating work machine is caused to perform the operation, for example.

The operation device for another designation operation has an operation lever which accepts a rotation operation. For example, an operation lever (traveling lever) of the traveling operation device is operated to move a lower traveling body 410 of the work machine 40. The traveling lever may serve also as a traveling pedal. For example, a traveling pedal may be provided which is fixed to a base portion or a lower end portion of the traveling lever. An operation lever (revolution lever) of the revolution operation device is operated to move a hydraulic revolution motor which configures a revolution mechanism 430 of the work machine 40. An operation lever (boom lever) of the boom operation device is operated to move a boom cylinder 442 of the work machine 40. An operation lever (arm lever) of the arm operation device is operated to move an arm cylinder 444 of the work machine 40. An operation lever (bucket lever) of the bucket operation device is operated to move a bucket cylinder 446 of the work machine 40.

Figure 3:
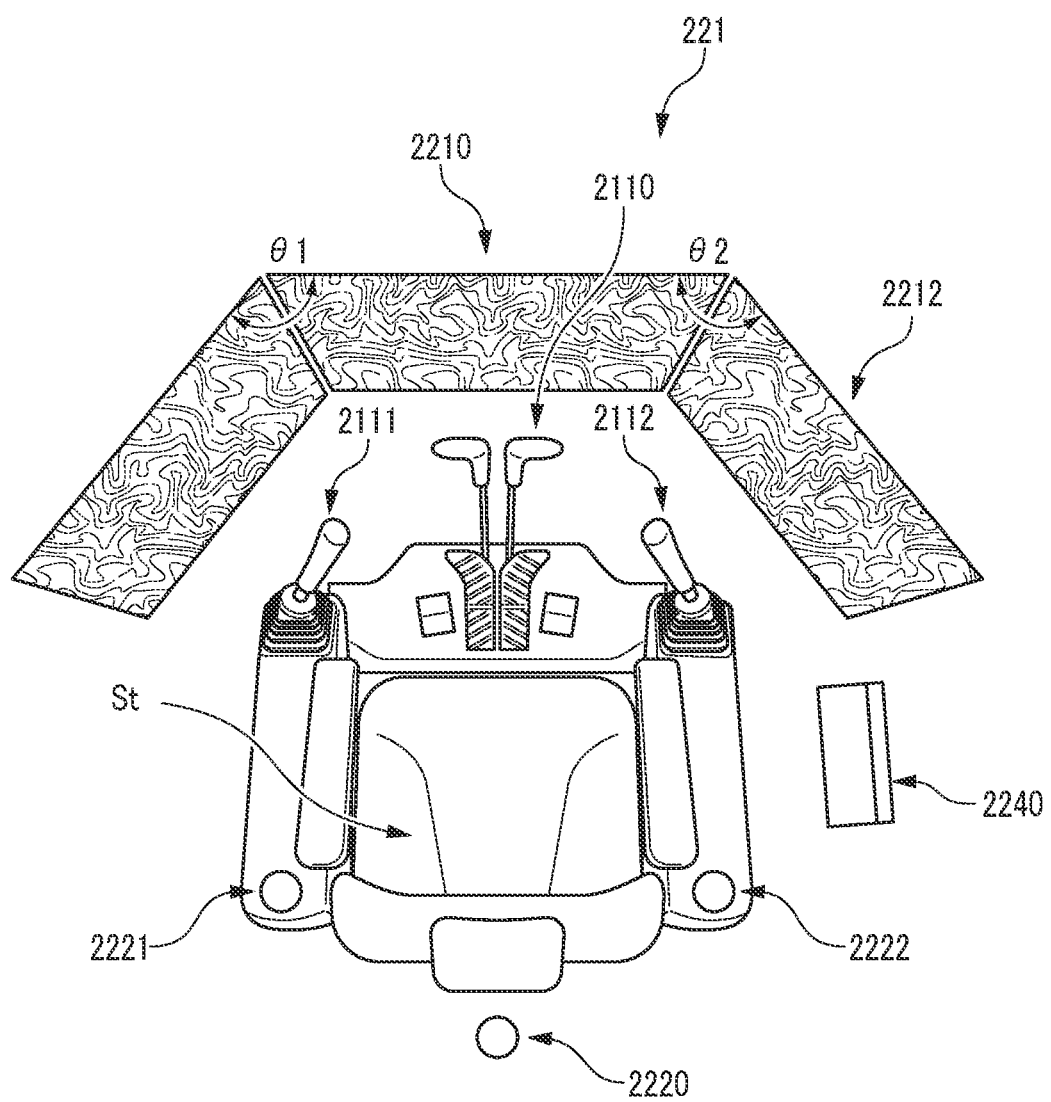
FIG. 3 is an explanatory diagram about a configuration of a remote operation device.

As illustrated in FIG. 3, the operation levers configuring the remote operation mechanism 211 are arranged around a seat St on which an operator OP1 is seated, for example. The seat St is in a form of a high-back chair with armrests but may be a seated portion in an arbitrary form on which the operator OP1 can be seated such as a form of a low-back chair without a headrest or a form of a chair without a backrest.

A pair of left and right traveling levers 2110 corresponding to left and right continuous tracks are arranged laterally side by side in a left-right direction in front of the seat St. One operation lever may also as plural operation levers. For example, a left operation lever 2111 provided in front of a left frame of the seat St, which is illustrated in FIG. 3, may function as the arm lever in a case where the left operation lever 2111 is operated in a front-rear direction and may function as the revolution lever in a case where the left operation lever 2111 is operated in the left-right direction. Similarly, a right operation lever 2112 provided in front of a right frame of the seat St, which is illustrated in FIG. 3, may function as the boom lever in a case where the right operation lever 2112 is operated in the front-rear direction and may function as the bucket lever in a case where the right operation lever 2112 is operated in the left-right direction. Lever patterns may arbitrarily be changed by an operation instruction from the operator OP1.

Figure 4:
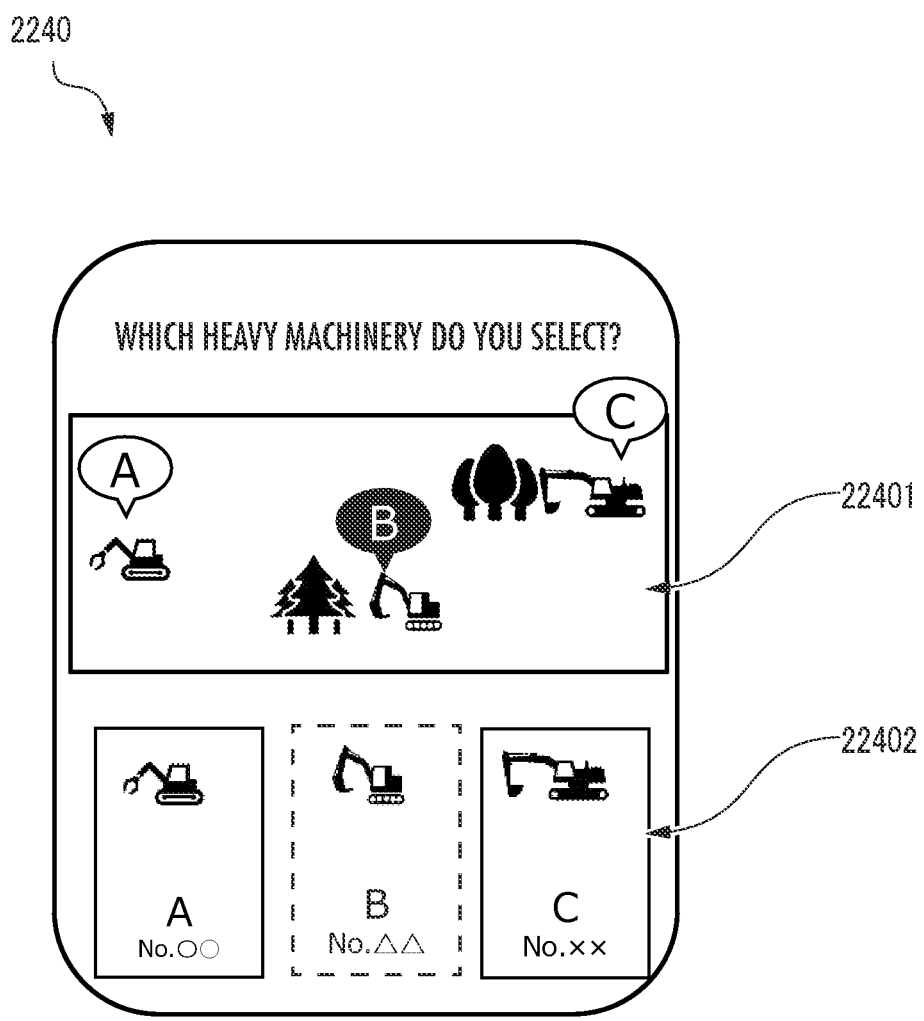
FIG. 4 is an explanatory diagram illustrating an example of screen display of the remote operation device.

As illustrated in FIG. 3, the hand terminal 2240 is a display device which is installed in obliquely right front when seen from a seated position of the seat St, for example. The hand terminal 2240 has an input unit such as a touch panel, for example. As illustrated in FIG. 4, the hand terminal 2240 is capable of selecting the first selected work machine 40 or the second selected work machine 50 to be connected with the remote operation device 20 by the input unit such as a touch panel, for example. A display screen and an input surface of the hand terminal 2240 is directed to the seat St side. The hand terminal 2240 may be configured to be capable of angle adjustment of the display screen.

Specifically, as illustrated in FIG. 4, the display screen of the hand terminal 2240 displays, in its upper section 22401, images of plural work machines A to C as candidates for connection and displays, in its lower section 22402, the work machines A to C surrounded by outer frames. The upper section 22401 displays a map which indicates the position relationship among the plural work machines A to C, and the lower section 22402 displays respective machine numbers (actual machine identification information), specifications, and so forth of the work machines A to C. When any of the images of the work machines A to C in the upper section 22401 or the lower section 22402 is tapped by the operator OP1 and the work machine to be connected with the remote operation device 20 is selected, a display form (such as a color of the outer frame, a thickness of frame lines of the outer frame, flashing of an icon of the work machine, or a background color) of the work machine A, B, or C selected by the tapping is changed in the lower section 22402 such that the selected work machine is identifiable against non-selected work machines.

As illustrated in FIG. 3, the remote image output device 221 is configured with a central remote image output device 2210, a left remote image output device 2211, and a right remote image output device 2212 which have generally rectangular screens and are respectively arranged in front, in obliquely left front, and in obliquely right front of the seat St, for example. The respective shapes and sizes of the screens (image display regions) of the central remote image output device 2210, the left remote image output device 2211, and the right remote image output device 2212 may be the same or different. As illustrated in FIG. 4, the hand terminal 2240 is capable of selecting the first selected work machine 40 or the second selected work machine 50 to be connected with the remote operation device 20 by the input unit such as the hand terminal 2240, for example.

The respective screens of the central remote image output device 2210, the left remote image output device 2211, and the right remote image output device 2212 may be parallel with a perpendicular direction or may be inclined with respect to the perpendicular direction. At least one image output device among the central remote image output device 2210, the left remote image output device 2211, and the right remote image output device 2212 may be configured with an image output device which is divided into plural portions. For example, the central remote image output device 2210 may be configured with a pair of image output devices which have generally rectangular screens and are adjacent to each other in an up-down direction.

The remote sound output device 222 is configured with one or plural speakers and is, as illustrated in FIG. 3, configured with a central remote sound output device 2220, a left remote sound output device 2221, and a right remote sound output device 2222 which are respectively arranged in the rear of the seat St, in a rear portion of the left armrest, and in a rear portion of the right armrest, for example. Respective specifications of the central remote sound output device 2220, the left remote sound output device 2221, and the right remote sound output device 2222 may be the same or different.

Configuration of First Selected Work Machine

As illustrated in FIG. 1, the first selected work machine 40 comprises an actual machine control device 400, an actual machine input interface 41, an actual machine output interface 42, and a positioning device 460. The actual machine control device 400 is configured with an arithmetic processing unit (a single-core processor or a multi-core processor or a processor core configuring that), reads necessary data and software from a storage device such as a memory, and executes a computation process following the software for the data as a target.

The positioning device 460 is a device which detects the position of the first selected work machine 40 and is configured with a global navigation satellite system (GNSS) receiver, for example. The position information of the first selected work machine 40, which is detected by the positioning device 460, is periodically transmitted to the work support server 10 and is stored in the database 102.

Figure 5:
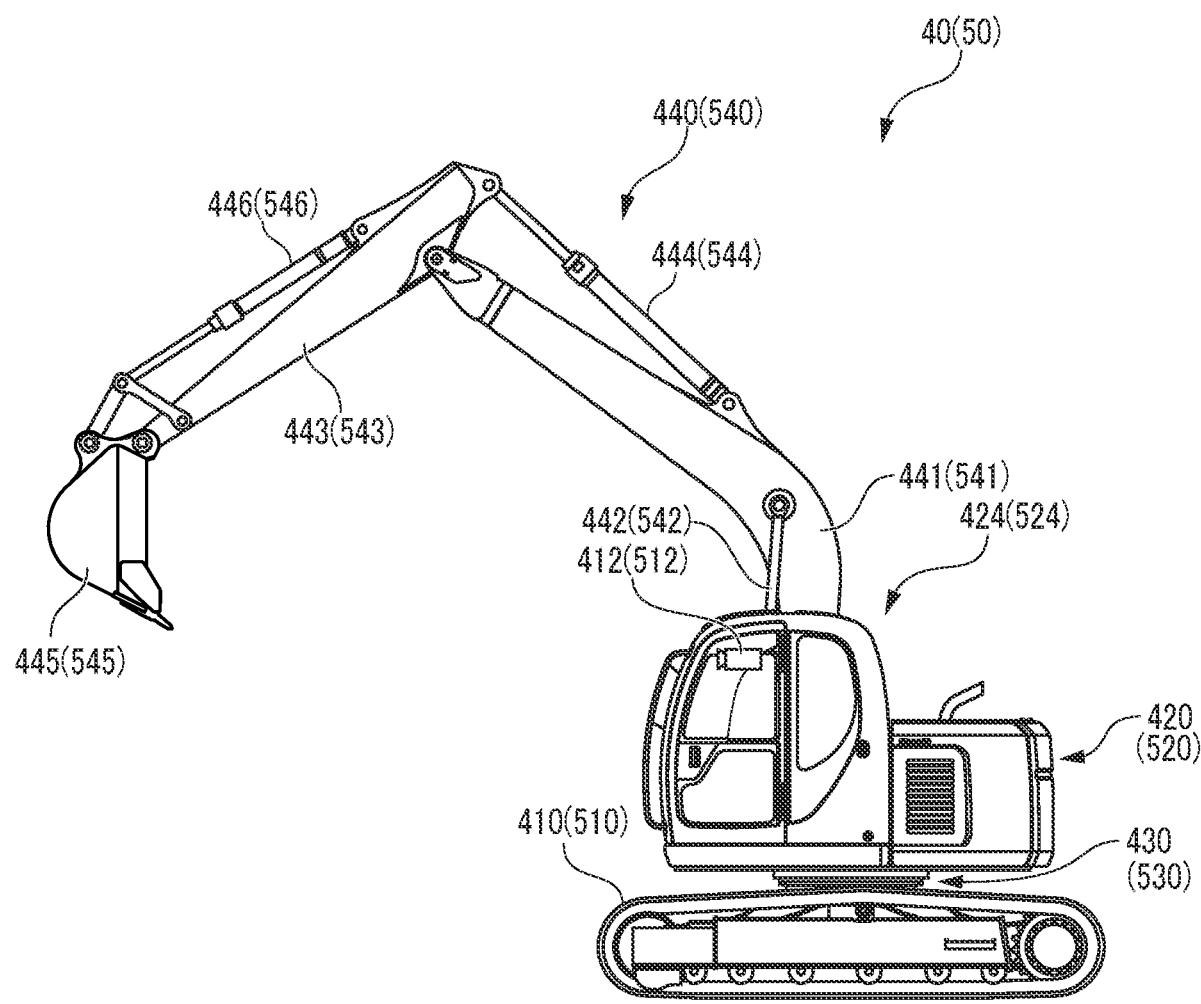
FIG. 5 is an explanatory diagram about a configuration of a work machine.

The first selected work machine 40 is a hydraulic, electric, or hybrid drive crawler excavator (construction machine), the hybrid drive being a combination of hydraulic and electric drives, for example, and comprises, as illustrated in FIG. 5, the crawler lower traveling body 410 and an upper revolving body 420 which is revolvably mounted on the lower traveling body 410 via the revolution mechanism 430. A cab 424 (operator cab) is provided to a front left side portion of the upper revolving body 420. A work mechanism 440 is provided to a front central portion of the upper revolving body 420.

The actual machine input interface 41 comprises an actual machine operation mechanism 411, the actual machine image-capturing device 412, and an actual machine state sensor group 414. The actual machine operation mechanism 411 comprises plural push buttons and plural operation levers, which are arranged similarly to the remote operation mechanism 211, around a seat arranged in an internal portion of the cab 424.

A drive mechanism or a robot, which receives a signal corresponding to an operation manner of the plural push buttons and the plural operation levers and moves actual machine operation buttons and actual machine operation levers based on the received signal, is provided to the cab 424.

The actual machine image-capturing device 412 is installed in the internal portion of the cab 424, for example, and captures an image of an environment including at least a portion of the work mechanism 440 through a front window and a pair of left and right side windows. A portion or all of the front window (or a window frame) and the side windows may be omitted.

Figure 6:
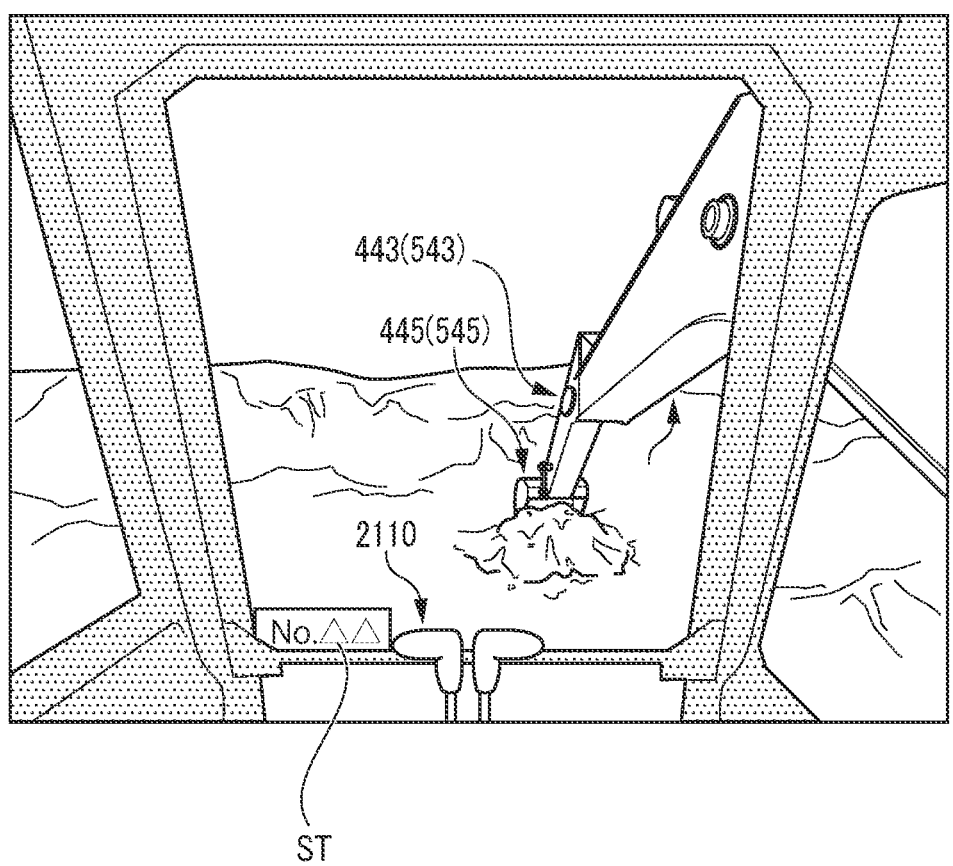
FIG. 6 is an explanatory diagram illustrating an example of an image photographed by an actual machine image-capturing device.

The actual machine image-capturing device 412 captures an image such that the image includes a sticker ST, in which the actual machine identification information (No. M in FIG. 6) corresponding to the actual machine identification information assigned to the first selected work machine 40 is indicated. The sticker ST in which the actual machine identification information is indicated is pasted on the front window of the first selected work machine 40 or the second selected work machine 50, for example. Images captured by the actual machine image-capturing device 412 are sequentially transmitted to the work support server 10. Note that the actual machine identification information is not limited to the sticker ST but may be engraved on a plate or may be engraved on a frame of the first selected work machine 40, for example.

The cab 424 is provided with a wiper device which wipes water drops adhered on the front window and a headlight device which is capable of projecting light forward. The actual machine image-capturing device 412 is installed such that a changing situation, which changes in accordance with one designation operation of the wiper device, the headlight, or the like appears in captured images.

The actual machine state sensor group 414 is configured with angle sensors for respectively measuring a rotation angle (derricking angle) of a boom 441 with respect to the upper revolving body 410, a rotation angle of an arm 443 with respect to the boom 441, and a rotation angle of a bucket 445 with respect to the arm 443, a revolution angle sensor for measuring a revolution angle of the upper revolving body 420 with respect to the lower traveling body 410, an external force sensor for measuring an external force exerted on the bucket 445, a three-axis acceleration sensor for measuring three-axis acceleration exerted on the upper revolving body 420, and so forth.

The actual machine output interface 42 comprises an actual machine image output device 421 and an actual machine wireless communication apparatus 422. The actual machine image output device 421 is arranged in the internal portion of the cab 424 and in the vicinity of the front window, for example. The actual machine image output device 421 may be omitted.

The work mechanism 440 as a work mechanism comprises the boom 441 which is attached to the upper revolving body 420 to be capable of derricking, the arm 443 which is rotatably coupled with a distal end of the boom 441, and the bucket 445 which is rotatably coupled with a distal end of the arm 443. To the work mechanism 440, the boom cylinder 442, the arm cylinder 444, and the bucket cylinder 446 which are configured with hydraulic cylinders capable of extending and contracting are attached. As a work unit, in addition to the bucket 445, various attachments such as a nibbler, a cutter, and a magnet may be used.

The boom cylinder 442 is interposed between the boom 441 and the upper revolving body 420 such that the boom cylinder 442 extends and contracts by being supplied with hydraulic oil so as to rotate the boom 441 in a derricking direction. The arm cylinder 444 is interposed between the arm 443 and the boom 441 such that the arm cylinder 444 extends and contracts by being supplied with hydraulic oil so as to rotate the arm 443 around a horizontal axis with respect to the boom 441. The bucket cylinder 446 is interposed between the bucket 445 and the arm 443 such that the bucket cylinder 446 extends and contracts by being supplied with hydraulic oil so as to rotate the bucket 445 around a horizontal axis with respect to the arm 443.

Configuration of Second Selected Work Machine

As illustrated in FIG. 1, the second selected work machine 50 comprises an actual machine control device 500, an actual machine input interface 51, an actual machine output interface 52, and a positioning device 560. The actual machine control device 500 is configured with an arithmetic processing unit (a single-core processor or a multi-core processor or a processor core configuring that), reads necessary data and software from a storage device such as a memory, and executes a computation process following the software for the data as a target.

The positioning device 560 is a device which detects the position of the second selected work machine 50 and is configured with a global navigation satellite system (GNSS) receiver, for example. The position information of the second selected work machine 50, which is detected by the positioning device 560, is periodically transmitted to the work support server 10 and is stored in the database 102.

The second selected work machine 50 is a hydraulic, electric, or hybrid drive crawler excavator (construction machine), the hybrid drive being a combination of hydraulic and electric drives, for example, and comprises, as illustrated in FIG. 5, a crawler lower traveling body 510 and an upper revolving body 520 which is revolvably mounted on the lower traveling body 510 via a revolution mechanism 530. A cab 524 (operator cab) is provided to a front left side portion of the upper revolving body 520. A work mechanism 540 is provided to a front central portion of the upper revolving body 520.

The actual machine input interface 51 comprises an actual machine operation mechanism 511, the actual machine image-capturing device 512, and an actual machine state sensor group 514. The actual machine operation mechanism 511 comprises plural push buttons and plural operation levers, which are arranged similarly to the remote operation mechanism 211, around a seat arranged in an internal portion of the cab 524.

A drive mechanism or a robot, which receives a signal corresponding to an operation manner of the plural push buttons and the plural operation levers and moves actual machine operation buttons and actual machine operation levers based on the received signal, is provided to the cab 524.

The actual machine image-capturing device 512 is installed in the internal portion of the cab 524, for example, and captures an image of an environment including at least a portion of the work mechanism 540 through a front window and a pair of left and right side windows. A portion or all of the front window (or a window frame) and the side windows may be omitted.

The actual machine image-capturing device 512 captures an image such that the image includes a sticker ST, in which the actual machine identification information assigned to the second selected work machine 50 is indicated. The sticker ST in which the actual machine identification information is indicated is pasted on the front window of the second selected work machine 50, for example. Images captured by the actual machine image-capturing device 512 are sequentially transmitted to the work support server 10 and is stored in the database 102. Note that the actual machine identification information is not limited to the sticker ST but may be engraved on a plate or may be engraved on a frame of the second selected work machine 50, for example.

The cab 524 is provided with a wiper device which wipes water drops adhered on the front window and a headlight device which is capable of projecting light forward. The actual machine image-capturing device 512 is installed such that a changing situation, which changes in accordance with one designation operation of the wiper device, the headlight, or the like appears in captured images.

The actual machine state sensor group 514 is configured with angle sensors for respectively measuring a rotation angle (derricking angle) of a boom 541 with respect to the upper revolving body 520, a rotation angle of an arm 543 with respect to the boom 541, and a rotation angle of a bucket 545 with respect to the arm 543, a revolution angle sensor for measuring a revolution angle of the upper revolving body 520 with respect to the lower traveling body 510, an external force sensor for measuring an external force exerted on the bucket 545, a three-axis acceleration sensor for measuring three-axis acceleration exerted on the upper revolving body 520, and so forth.

The actual machine output interface 52 comprises an actual machine image output device 521 and an actual machine wireless communication apparatus 522. The actual machine image output device 521 is arranged in the internal portion of the cab 524 and in the vicinity of the front window, for example. The actual machine image output device 521 may be omitted.

The work mechanism 540 as a work mechanism comprises the boom 541 which is attached to the upper revolving body 520 to be capable of derricking, the arm 543 which is rotatably coupled with a distal end of the boom 541, and the bucket 545 which is rotatably coupled with a distal end of the arm 543. To the work mechanism 540, a boom cylinder 542, an arm cylinder 544, and a bucket cylinder 546 which are configured with hydraulic cylinders capable of extending and contracting are attached. As a work unit, in addition to the bucket 545, various attachments such as a nibbler, a cutter, and a magnet may be used.

The boom cylinder 542 is interposed between the boom 541 and the upper revolving body 520 such that the boom cylinder 542 extends and contracts by being supplied with hydraulic oil so as to rotate the boom 541 in a derricking direction. The arm cylinder 544 is interposed between the arm 543 and the boom 541 such that the arm cylinder 544 extends and contracts by being supplied with hydraulic oil so as to rotate the arm 543 around a horizontal axis with respect to the boom 541. The bucket cylinder 546 is interposed between the bucket 545 and the arm 543 such that the bucket cylinder 546 extends and contracts by being supplied with hydraulic oil so as to rotate the bucket 545 around a horizontal axis with respect to the arm 543.

Display Process for Hand Terminal 2240

Figure 7:
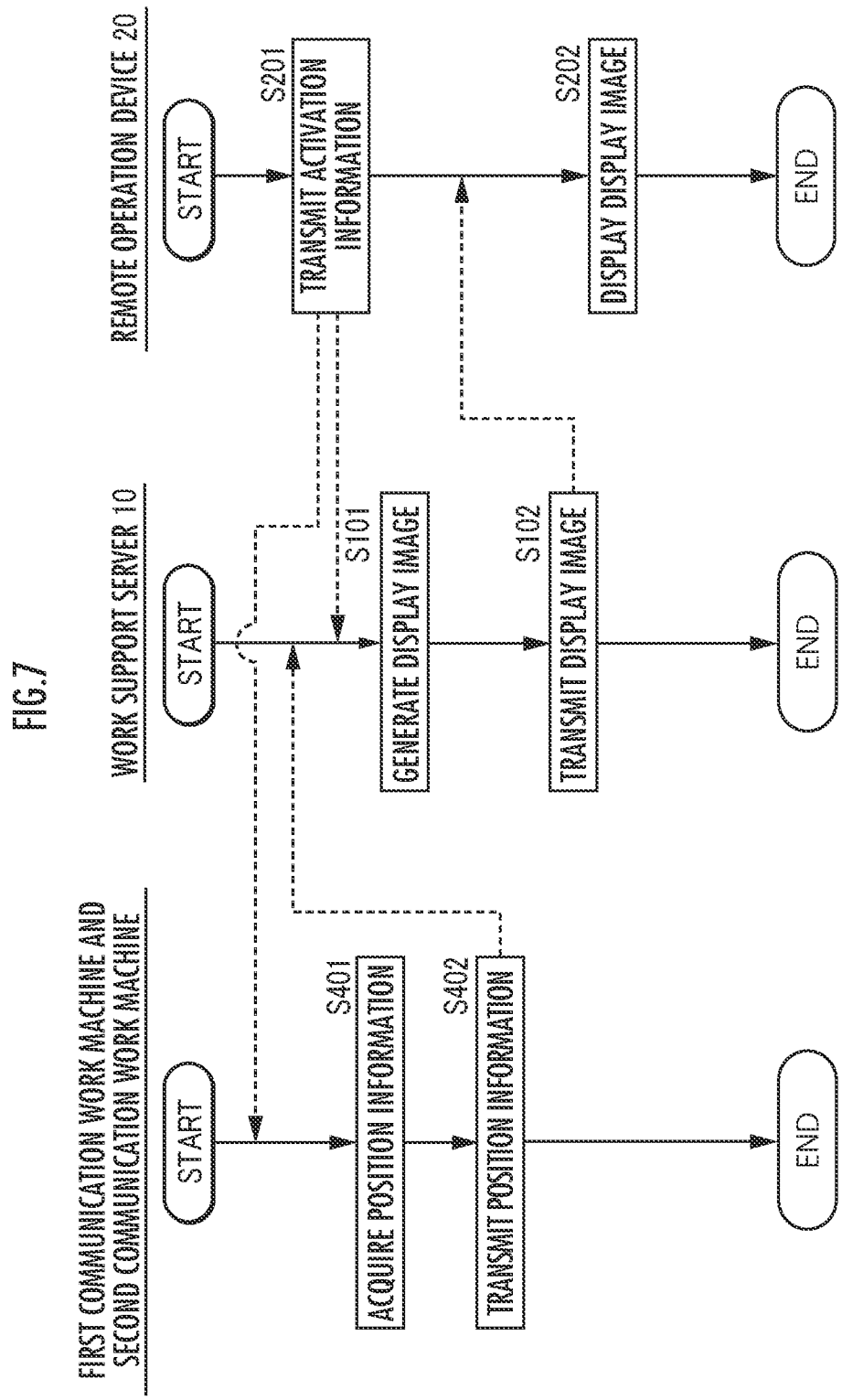
FIG. 7 is a flowchart illustrating an example of a display process for a hand terminal by the work support server.

A description will be made, by using a flowchart illustrated in FIG. 7, about a display process by the work support system, which is practiced by cooperation among the work support server 10, the remote operation device 20, and plural work machines A to C (a first communication work machine and a second communication work machine in FIG. 7) as candidates to be connected with the remote operation device 20.

The display process starts with activation of the remote operation device 20 being a trigger. When the remote operation device 20 is activated by the operator OP1, the remote operation device 20 generates activation information as information that the remote operation device 20 has been activated and transmits the activation information to the work support server 10 and the work machines A to C (step S201).

Each of the work machines A to C starts a process with reception of the activation information being a trigger. When the activation information is received, each of the work machines A to C periodically acquires position information for the work support server 10 (step S401) and transmits the acquired position information to the work support server 10 (step S402).

The work support server 10 starts a process with reception of the activation information being a trigger. The work support server 10 acquires the position information transmitted from each of the work machines A to C by referring to the database 102 and generates a display image (Step S101).

The display image is generated based on the position information of each of the work machines A to C and the map data in step S101. Note that the map data is created based on map information, an aerial photograph, or the like of the work site. The display image is generated by superimposing icons of the first selected work machine 40 and the second selected work machine 50 in respective positions corresponding to the pieces of position information on the map data, for example. It is desirable that a scale of the map data can appropriately be changed in accordance with a form of practice and that the position information of each of the work machines capable of being connected be included on any scale.

The work support server 10 transmits the display image generated in step S101 to the remote operation device 20 (step S102).

When the display image is received, for example, as illustrated in FIG. 4, the remote operation device 20 outputs the display image to the upper section 22401 of the display screen of the hand terminal 2240, thereby displays the display image (step S202), and finishes the process when the activation of the remote operation device 20 is finished, for example.

In the display process of the display image in step S202, the display image is desirably displayed in the upper section 22401 of the display screen of the hand terminal 2240 such that the first selected work machine 40 or the second selected work machine 50 as a candidate to be connected with the remote operation device 20 is selectable. As described above, the display image is displayed in a birds eye manner, and the operator OP1 is enabled to recognize the positions of the plural work machines A to C as candidates to be connected in the work site.

Work Support Process

A description will be made, by using a flowchart illustrated in FIG. 8, about a work support process by the work support system, which is practiced by cooperation among the work support server 10, the remote operation device 20, the first selected work machine 40, and the second selected work machine 50 in the above configurations.

The work support system starts the work support process with execution of the process in step S202 of the display process by the remote operation device 20 being a trigger. The operator OP1 selects the first selected work machine 40 or the second selected work machine 50 as a candidate to be connected by touching an image of the work machine displayed on the hand terminal 2240, for example. The remote operation device 20 determines whether or not selection of the work machine to be connected with the remote operation device 20 is performed, that is, a designation operation is performed (step S211).

When it is determined that the designation operation is performed (step S211: Y), the remote operation device 20 transmits information (selection information) of the work machine selected by the operator OP1 to the work support server 10 (step S212).

When the selection information is received, the first support process element 121 of the work support server 10 stores the selection information in the database 102. The work support server 10 starts the work support process with reception of the selection information transmitted from the remote operation device 20 being a trigger. When the selection information is received, the first support process element 121 of the work support server 10 refers to the database 102, chooses the work machine corresponding to the selection information based on the actual machine identification information, and requests an actual machine image-capturing device mounted on a first work machine (hereinafter, also referred to as a first communication work machine) to transmit an image through the first communication path identified by the first identifier of the chosen work machine (step S111).

The actual machine image-capturing device of the first communication work machine starts a process with reception of a transmission request being a trigger. When the transmission request is received, the actual machine image-capturing device of the first communication work machine transmits a captured image to the work support server 10 through the first communication path (step S411).

The first support process element 121 of the work support server 10 acquires the captured image transmitted from the actual machine image-capturing device of the first communication work machine (step S112), transmits the captured image to the remote operation device 20, and causes the remote image output device 221 to output the captured image (step S113). Consequently, the first support process element 121 is capable of acquiring a captured image which is captured by the actual machine image-capturing device mounted on the first communication work machine and of causing the remote image output device 221 of the remote operation device 20 to output the captured image.

When captured images are received, the remote operation device 20 sequentially outputs the received captured images to the remote image output device 221, for example. That is, the remote operation device 20 continues to output captured images transmitted from the work support server 10 to the remote image output device 221 until the process is finished.

Next, the remote operation device 20 displays an indication such as a message which advises execution of one designation operation on the remote image output device 221, for example (step S213). Examples of the message which advises execution of one designation operation may include "actuate the wipers", "light the headlights", and so forth.

When one designation operation is executed, the remote operation device 20 transmits a command signal for executing one designation operation to the work support server 10 (step S214).

The second support process element 122 of the work support server 10 chooses the work machine corresponding to the selection information based on the actual machine identification information and transmits the command signal for executing one designation operation, which is transmitted from the remote operation device 20, to a second work machine (hereinafter, also referred to as a second communication work machine) via the second communication path identified by the second identifier of the chosen work machine (step S114). Consequently, the second support process element 122 of the work support server 10 is capable of recognizing that one designation operation is performed, which is a portion of plural kinds of operations for causing the second communication work machine among plural selected work machines to act, the second communication work machine establishing communication with the remote operation device 20, the communication being associated with the second communication path by the selection information, and in which a changing situation of the action corresponding to the operation appears in a captured image, and is capable of transmitting the command signal corresponding to the one designation operation to the second communication work machine.

When the command signal about execution of one designation operation is received, the second communication work machine executes one designation operation (step S412).

The operator OP1 checks the captured image by the actual machine image-capturing device of the first communication work machine, which is displayed on the remote image output device 221 of the remote operation device 20, and can thereby check whether or not one designation operation is executed in the second communication work machine.

Specifically, in a case where the first communication work machine and the second communication work machine are not the same selected work machine, the operator OP1 cannot check the circumstance of one designation operation executed by the second communication work machine by the captured image by the actual machine image-capturing device of the first communication work machine. On the other hand, in a case where the first communication work machine and the second communication work machine are the same selected work machine, the operator OP1 can check the circumstance of one designation operation executed by the second communication work machine by the captured image by the actual machine image-capturing device of the first communication work machine.

The operator OP1 inputs whether one designation operation is performed in the second communication work machine by touching the hand terminal 2240, for example. The remote operation device 20 determines whether or not one designation operation is executed in the second communication work machine based on the input by the operator (step S215).

When it is determined that one designation operation is executed in the second communication work machine (step S215: Y), the remote operation device 20 transmits proper-state information indicating that the first communication work machine and the second communication work machine are the same selected work machine to the work support server 10 (step S216).

When it is determined that one designation operation is not executed in the second communication work machine (step S215: N), the remote operation device 20 transmits improper-state information indicating that the first communication work machine and the second communication work machine are not the same selected work machine to the work support server 10 (step S217).

The second support process element 122 of the work support server 10 determines whether or not a cancellation condition for another designation operation is satisfied based on the proper-state information or the improper-state information which is transmitted from the remote operation device 20 (step S115).

When it is determined that the cancellation condition for the other designation operation is satisfied (step S115: Y), the second support process element 122 of the work support server 10 starts acceptance of the other designation operation (step S116). That is, in the present embodiment, the second support process element 122 determines that a cancellation operation is performed in the remote operation device based on reception of the proper-state information. Further, after acceptance of the other designation operation is started in step S116, the second support process element 122 transmits the command signal corresponding to the other designation operation, which is transmitted from the remote operation device 20, to the second communication work machine. Accordingly, based on a remote operation command corresponding to an operation manner of the remote operation mechanism 211, the operation manner being recognized by the remote control device 200 of the remote operation device 20, actions by the work mechanism and so forth of the second communication work machine are controlled.

When it is determined that the cancellation condition for the other designation operation is not satisfied (step S115: N), the second support process element 122 of the work support server 10 maintains suspension of acceptance of the other designation operation (step S117) and finishes the work support process.

The operator OP1 can visually check a captured image in which one designation operation is executed and which is displayed on the remote image output device 221. Accordingly, the operator OP1 is enabled to check whether the first selected work machine 40 or the second selected work machine 50 with which the remote operation device 20 is connected agrees with the selection information and the first communication work machine and second communication work machine.

As described above, in the remote operation system of the present invention, the captured image which is captured by the actual machine image-capturing device mounted on the first communication work machine is acquired via the first communication path based on the selection information specifying the cooperating work machine, and the command signal corresponding to one designation operation is transmitted to the second communication work machine. Consequently, through the captured image, the operator can check whether or not the first communication work machine acts in accordance with one designation operation performed for the second communication work machine, that is, whether or not an operation performed for the cooperating work machine as the remote operation target is performed in the cooperating work machine. Accordingly, the operator can check a connection situation with the work machine as the remote operation target.

Further, the actual machine identification information is together displayed in the display image, and the operator OP1 can thereby visually check whether the actual machine identification information of the captured image displayed in the remote image output device 221 matches the actual machine identification information in the display image and is thus enabled to quickly and accurately perform checking work.

In the above description of the embodiment, a description is made about a case where the work support process is executed by the work support server 10. However, the work support process may be performed by the remote operation device 20 or may be performed by the first selected work machine 40 or the second selected work machine 50.

Further, a description is made on the assumption that an image is acquired which is captured by the actual machine image-capturing device 412 of the first selected work machine 40 or the actual machine image-capturing device 512 of the second selected work machine 50. However, an image may be acquired which is captured by another image-capturing device than the actual machine image-capturing device 412 of the first selected work machine 40 or the actual machine image-capturing device 512 of the second selected work machine 50.

Examples of such an image-capturing device may include a fixed point image-capturing device provided in a position where an image of an external appearance of the first selected work machine 40 or the second selected work machine 50 is capable of being captured and an image-capturing device provided to an aerial vehicle such as a drone.

In a case where such an image-capturing device is used, the sticker ST in which the actual machine identification information is indicated is preferably provided in a position which is visually recognizable from the outside of the first selected work machine 40 and the second selected work machine 50. Examples of such a position may include side surfaces of the upper revolving body 420 of the first selected work machine 40 and of the upper revolving body 520 of the second selected work machine 50. Note that when a connection operation of the first selected work machine 40 or the second selected work machine 50 with the remote operation device 20 is performed, the fact that the connection operation is performed is desirably notified to those image-capturing devices. Accordingly, transmission of an image from the image-capturing device to the work support server 10 can be caused to start.

In the remote operation system of the present invention, the captured image which is captured by the actual machine image-capturing device mounted on the first work machine is acquired via the first communication path based on the selection information specifying the cooperating work machine, and the command signal corresponding to one designation operation is transmitted to the second work machine. Consequently, through the captured image, the operator can check whether or not the first work machine acts in accordance with one designation operation performed for the second work machine, that is, whether or not an operation performed for the cooperating work machine as the remote operation target is performed in the cooperating work machine. Accordingly, the operator can check the connection situation with the work machine as the remote operation target.

In the remote operation system of the present invention, the second support process element preferably suspends transmission of a command signal corresponding to another designation operation for causing the cooperating work machine to act to the second work machine in a case where a cancellation condition is not satisfied and preferably permits transmission of the command signal corresponding to the other designation operation for causing the cooperating work machine to act to the second work machine in a case where the cancellation condition is satisfied, and the cancellation condition preferably includes a fact that a cancellation operation is performed in the remote operation device.

In such an aspect, until the operator checks the connection situation with the work machine as the remote operation target, the work machine can be prevented from running due to another designation operation. After the operator checks the connection situation, the work machine can remotely be operated by operations including the other designation operation.

In the remote operation system of the present invention, the second support process element preferably acquires a determination result about whether or not the one designation operation is executed, preferably permits another designation operation for causing the cooperating work machine to act in a case where the one designation operation is executed, and preferably transmits a command signal corresponding to the other designation operation to the second work machine.

In such an aspect, with execution of one designation operation being a condition, another designation operation can be permitted for the work machine as the remote operation target.

In the remote operation system of the present invention, the second support process element preferably suspends transmission of a command signal corresponding to another designation operation for causing the cooperating work machine to act to the second work machine in a case where a cancellation condition is not satisfied and preferably permits transmission of the command signal corresponding to the other designation operation for causing the cooperating work machine to act to the second work machine in a case where the cancellation condition is satisfied, and the cancellation condition preferably includes a fact that in a case where the one designation operation is executed, the second support process element acquires a determination result about whether or not a changing situation of an action corresponding to the one designation operation is present in the captured image, and the changing situation of the action corresponding to the one designation operation is present.

In such an aspect, because the connection situation with the work machine as the remote operation target can automatically be assessed, checking work by the operator can be reduced.

In the remote operation system of the present invention, the first support process element preferably acquires position data of the plural work machines as the remote operation target, and the second support process element preferably generates a display image in which each of the plural work machines appears based on the plural sets of position data and preferably transmits the display image to the remote operation device.

In such an aspect, the operator can check a circumstance where each of the plural work machines as the remote operation target appears in the display image and can thus recognize relative positions of the work machines in the work site.

REFERENCE SIGNS LIST 10 work support server
121 first support process element
122 second support process element
20 remote operation device
40 first selected work machine
50 second selected work machine

What is claimed is:

1. A remote operation system configured by a work support apparatus having a mutual communication function of communicating with each of plural work machines and with a remote operation device which remotely operates a cooperating work machine as one work machine as a remote operation target among the plural work machines, the remote operation system comprising:
   a remote input interface provided in the remote operation device and configured to be capable of selecting the cooperating work machine as the one work machine as the remote operation target among the plural work machines;
   a remote control device configured by a processor which executes a processing to determine whether or not a designation operation is performed to select the cooperating work machine through the remote input interface by an operator and to transmit selection information which is information of the cooperating work machine selected by the operator to the work support apparatus in a case where it is determined that the designation operation is performed;
   a memory and/or an external data base server in which a data base is read or searched by the work support apparatus, the data base retains first identifiers which are assigned to a first communication path of an actual machine image-capturing device mounted on a first work machine and a second work machine among the plural work machines, second identifiers which are assigned to a second communication path of an operation system of each of the first work machine and the second work machine, and actual machine identification information including information of a work machine corresponding to each identifier assigned to each of the first work machine and the second work machine;
   a first actual machine control device provided in the first work machine and configured by a processor which executes a processing of transmitting an captured image captured by the actual machine image-capturing device mounted on the first work machine to the work support apparatus through the first communication path;
   a second actual machine control device provided in the second work machine and configured by a processor which executes a processing of, in a case where the second work machine receives command signal for executing one designation operation, causing the second work machine to execute according to the received command signal, the one designation operation which is a portion of plural kinds of operations for causing the second work machine establishing communication with the remote operation device to act, and in which a changing situation of an action corresponding to the operation appears in a captured image captured by the actual machine image-capturing device mounted on the second work machine;

a remote image output device provided in the remote operation device, and in a case where the remote operation device receives the captured image transmitted from the actual machine image-capturing device of the first work machine, outputs the received captured image;

wherein the work support apparatus comprises a first support process element and a second support process element, each composed of a processor, in a case where the selecting information is received by the remote operation device, the first support process element is configured to refer to the database, select the work machine corresponding to the selection information based on the actual machine identification information, and transmit to the first work machine a transmission request which is a request to transmit a captured image by the actual machine image-capturing device mounted on the first work machine via the first communication path identified by the first identifier of the selected work machine, thereby to cause the first actual machine control device of the first work machine to execute a processing of causing the actual machine image-capturing device of the first work machine which received the transmission request to transmit the captured image to the work support apparatus via the first communication path, and further configured to transmit the captured image transmit from the actual machine image-capturing device of the first work machine to the remote operation device, thereby to cause the remote operation device to receive the captured image and output the captured image to the remote image output device of the remote operation device; and the second support process element is configured to select the work machine corresponding to the selection information based on the actual machine identification information and to transmit the command signal for executing the one designation operation to the second work machine via the second communication path identified by the second identifier of the selected work machine, thereby to cause the second actual machine control device of the second work machine to execute a processing of causing the second work machine which received the command signal to execute the one designation operation.

2. The remote operation system according to claim 1, wherein the remote operation device includes a hand terminal which functions as an input element to input by the operator whether the one designation operation is executed at a second communication work machine the remote control device determines whether or not the one designation operation is executed in the second communication work machine based on the input to the hand terminal by the operator, and if it is determined that the one designation operation is executed in the second communication work machine, transmits proper-state information to the work support apparatus, and if it is determined that the one designation operation is not executed in the second communication work machine, transmits improper-state information to the work support apparatus the second support process element suspends transmission of a command signal corresponding to another designation operation for causing the cooperating work machine to act to the second work machine in a case where a cancellation condition is not satisfied, and permits transmission of the command signal corresponding to the other designation operation for causing the cooperating work machine to act to the second work machine in a case where the cancellation condition is satisfied, and the cancellation condition includes a fact that the second support process element received the proper-state information.

3. The remote operation system according to claim 1, wherein the remote operation device includes a hand terminal which functions as an input element to input by the operator whether the one designation operation is executed at a second communication work machine, the remote control device determines whether or not the one designation operation is executed in the second communication work machine based on the input to the hand terminal by the operator, and if it is determined that the one designation operation is executed in the second communication work machine, transmits proper-state information to the work support apparatus, and if it is determined that the one designation operation is not executed in the second communication work machine, transmits improper-state information to the work support apparatus, the second support process element acquires a determination result about whether or not the one designation operation is executed by receiving the proper-state information or the improper-state information transmitted from the remote operation device, and in a case where it is determined that the one designation operation is executed based on the proper-state information, permits another designation operation for causing the cooperating work machine to act, and transmits a command signal corresponding to the other designation operation to the second work machine.

4. The remote operation system according to claim 1, wherein in a case where the remote operation device receives a display image transmitted from the work support apparatus, the remote image output device outputs the received display image, the plural work machines each includes a positioning device which detects position information and is configured to transmit the acquired position information to the work support apparatus, the first support process element refers to and acquires the position information transmitted from each of the plural work machines, and the second support process element generates as the display image, an image in which each of the plural work machines appears by superimposing icons at positions corresponding to the position information on a map data based on the map data and the position information, and transmits the generated display image to the remote operation device, thereby to have the display image received by the remote operation device and to cause the remote image output device of the remote operation device to output the display image.

\* \* \* \* \*